US012574422B2

(12) United States Patent
Lonkar

(10) Patent No.: US 12,574,422 B2
(45) Date of Patent: Mar. 10, 2026

(54) PRIORITY CALL HANDLING IN WIRELESS COMMUNICATION NETWORKS

(71) Applicant: T-MOBILE INNOVATIONS LLC, Overland Park, KS (US)

(72) Inventor: Shon Lonkar, Maple Valley, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 418 days.

(21) Appl. No.: 18/355,733

(22) Filed: Jul. 20, 2023

(65) Prior Publication Data

US 2025/0030750 A1 Jan. 23, 2025

(51) Int. Cl.
*H04L 12/00* (2006.01)
*H04L 65/1016* (2022.01)
*H04L 65/1046* (2022.01)
*H04L 65/1104* (2022.01)
*H04W 84/04* (2009.01)

(52) U.S. Cl.
CPC ...... *H04L 65/1046* (2013.01); *H04L 65/1016* (2013.01); *H04L 65/1104* (2022.05); *H04W 84/042* (2013.01)

(58) Field of Classification Search
CPC ............. H04L 65/1046; H04L 65/1016; H04L 65/1104; H04L 65/1069; H04W 84/042
USPC ........................................ 370/259
See application file for complete search history.

(56) References Cited

U.S. PATENT DOCUMENTS

| | | | |
|---|---|---|---|
| 12,149,566 B1 * | 11/2024 | Allu Balan ......... | H04L 65/1045 |
| 12,413,434 B1 * | 9/2025 | Mirza .................. | H04L 12/1407 |
| 2018/0007601 A1 * | 1/2018 | Singh .................. | H04L 65/1016 |
| 2018/0227383 A1 * | 8/2018 | Vasanthasenan ... | H04L 65/1069 |
| 2021/0328872 A1 * | 10/2021 | Bongaarts ............. | H04M 15/00 |
| 2023/0088868 A1 * | 3/2023 | Haltom ............. | H04M 3/42059 |
| | | | 370/352 |

FOREIGN PATENT DOCUMENTS

| | | | | | |
|---|---|---|---|---|---|
| GB | 2542573 | A | * | 3/2017 | .............. H04W 8/12 |
| KR | 20070136273 | A | * | 12/2007 | ......... H04L 65/1069 |
| KR | 20090016242 | A | * | 2/2009 | ............. H04L 65/80 |
| KR | 20090068594 | A | * | 6/2009 | ......... H04L 65/1069 |
| KR | 100940858 | B1 | * | 2/2010 | ............. H04W 4/90 |

* cited by examiner

*Primary Examiner* — Frantz Coby

(57) ABSTRACT

Technology is disclosed herein for WPS call handling for at a roaming or non-WPS supported locations. In an implementation, a wireless network receives a SIP invite for user device from a roaming RAN of a visited network. The user device is subscribed to the wireless network and is authorized for WPS service by the wireless network. The IMS core of the wireless network sends a request to the subscriber management function of the network for a user profile for the user device including the PLMN of the roaming RAN. The subscriber management function identifies a user profile from multiple user profiles for the user device based on the PLMN. Each of the multiple user profiles corresponds to a PLMN category of multiple PLMN categories. The session manager of the wireless network sends a request to establish a default bearer to the roaming RAN based on the user profile.

20 Claims, 7 Drawing Sheets

RECEIVE SIP INVITE FROM ROAMING RAN FOR WPS UE
<u>201</u>

REQUEST USER PROFILE INCLUDING PLMN OF ROAMING RAN
<u>203</u>

SELECT USER PROFILE BASED ON PLMN OF ROAMING RAN
<u>205</u>

SENDING A REQUEST TO THE ROAMING RAN TO ESTABLISH A DEFAULT BEARER BASED ON USER PROFILE
<u>207</u>

200

COMPUTING SYSTEM 701

STORAGE SYSTEM 703

SOFTWARE 705

WPS CALL HANDLING PROCESS 706

COMM. I/F SYSTEM 707

PROCESSING SYSTEM 702

USER I/F SYSTEM 709

PRIORITY CALL HANDLING IN WIRELESS COMMUNICATION NETWORKS

TECHNICAL FIELD

Aspects of the disclosure are related to the field of wireless communication networks and in particular to priority calling handling.

BACKGROUND

In wireless communication networks, Wireless Priority Service (WPS) is a federal program which authorizes wireless communication service providers to prioritize WPS calls over wireless networks. WPS may be ascribed to certain users who require high-priority IMS call service, such as to first responders performing services for public health, safety, and maintenance of law and order or to high-level government personnel performing critical national security and emergency preparedness functions. When a WPS subscriber places a WPS call, the call will receive priority over other calls on the wireless network providing greater reliability in placing and maintaining the call. Some authorized WPS users may place WPS calls by dialing a prefix prior to the call, while the calls of other WPS users will default to WPS service automatically.

To secure high-priority service for a WPS call, when the home network identifies that a WPS call is being placed, the network may implement mechanisms to prioritize the call over regular calls. The network may establish a dedicated bearer for the WPS call over and above the default (non-WPS) bearer. The dedicated bearer is activated on-demand and includes an uplifted QCI (Quality-of-Service Class Indicator) for the default bearer which indicates that the call should receive a higher priority level of service, such as the use of dedicated network resources for preferential setup and routing, higher bandwidth or guaranteed bit rate, and lower latency for the call.

Each wireless communication service provider establishes its own protocol or prioritization for WPS calls. Because WPS service is provided authorized by the U.S. Federal Communications Commission, the WPS status of IMS calls are frequently not recognized in other countries. Similarly, each service provider may establish its own implementation of WPS service which may not be compatible with the WPS service of other carriers. When a WPS subscriber places a WPS call on a roaming network which does not recognize the WPS status of the call, the WPS call will likely fail.

OVERVIEW

Technology, including systems, methods, and devices, is disclosed herein for WPS call handling for at a roaming or non-WPS supported locations. In an implementation, a wireless network, including a subscriber management function, an IMS core, and a session manager, receives a SIP invite for user device from a roaming RAN of a visited network. The user device is subscribed to the wireless network and is authorized for WPS service by the wireless network. The IMS core of the wireless network sends a request to the subscriber management function for a user profile for the user device including the public land mobile network (PLMN) of the roaming RAN. The subscriber management function identifies a user profile from multiple user profiles for the user device based on the PLMN. Each of the multiple user profiles corresponds to a PLMN category of multiple PLMN categories. The session manager of the wireless network sends a request to establish a default bearer to the roaming RAN based on the user profile.

In some implementations, the call is a WPS call. In some implementations, the multiple PLMN categories include a home category and a roaming category. In some implementations, the home category includes WPS service and the roaming category does not include WPS service.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

DETAILED DESCRIPTION

Figure 1:
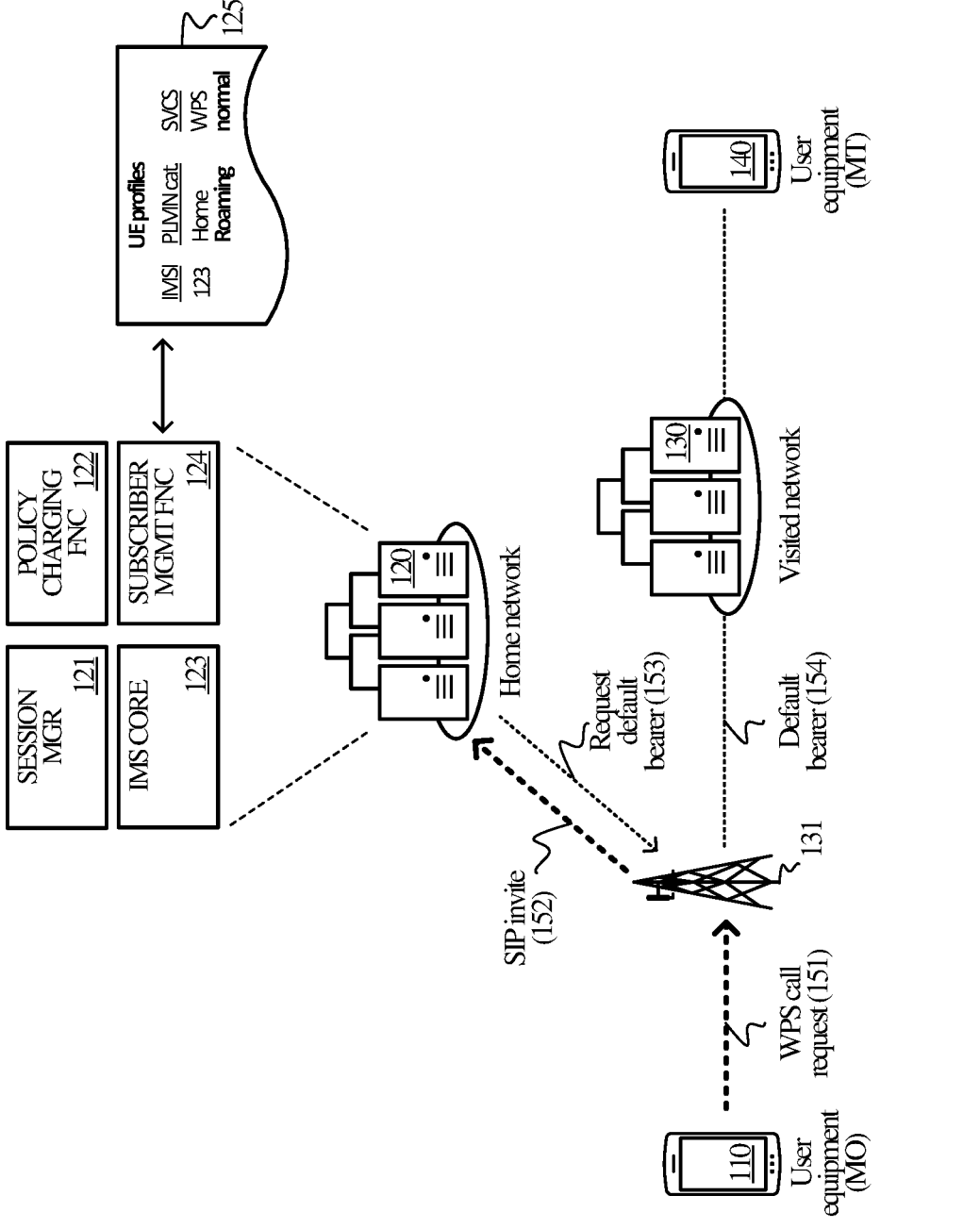
FIG. 1 illustrates an operational environment for operating a wireless network for WPS call handling in an implementation.

Systems, methods, and devices are disclosed herein for establishing a WPS call when the call is placed via the access network of a visited network by omitting a request for the higher priority level of the call to enable the visited network to recognize the call. In an implementation, when a WPS subscriber device places a call which connects to a roaming radio access network (RAN) (i.e., a RAN of a visited network rather than the user's home network), the roaming RAN sends a Session Initiation Protocol (SIP) invite to the IMS core of the user's home network to establish the call. The SIP invite includes the Public Land Mobile Network (PLMN) of the visited network. When the Internet Protocol (IP) Multimedia Service (IMS) core of the user's home network receives the SIP invite for the call from the roaming RAN, the IMS core requests a user profile from the subscriber management function for IMS service, such as a Home Subscriber Service (HSS) or Unified Data Management (UDM) network function. Upon receiving the request for the user profile, the subscriber management function identifies a user profile for the device and selects a profile for the device for roaming networks. The user profile for roaming networks indicates a normal priority level (e.g., priority level 9) for the call which is recognizable by the visited network rather than indicating the WPS priority or uplifted QCI profile of the call (e.g., priority level 2) which is not recognized by the visited network. Thus, the visited network, seeing that the (WPS) call to be a normal priority call, places the call for the WPS subscriber device. The subscriber management device may store user profile information in an associated datastore, such as a Unified Data Repository (UDR).

The user profile provided by the subscriber management function of the home network includes information about the type of services available to the user, depending on the user's subscription plan, the user's device type, the Quality of Service (QOS) of the request, and so on. In an implementation, for WPS subscribers or WPS calls, the subscriber management function stores in an associated datastore at least two user profiles, a WPS profile and a non-WPS profile. When the IMS core requests the user profile for the WPS call, the subscriber management function selects the user profile to return to the IMS core based on the PLMN of the SIP invite. When the PLMN indicates that the visited network does not recognize or support the WPS status of the call, the subscriber management function returns a non-WPS profile, such as a default profile for a normal IMS call to the IMS core. The non-WPS or default profile omits a request for a dedicated bearer for the call. For example, the non-WPS profile may omit WPS indicators, such as an MPS identifier or a reservation priority value which would cause the IMS core to request a dedicated bearer with a QCI uplift for the default bearer. The IMS core proceeds with requesting that a default bearer from the visited network for the call to be established.

In an implementation, the datastore associated with the subscriber management function stores, for a given subscriber device, device identity information along subscription data, authentication and authorization data, applicable policy and charging rules, location information, service usage records, roaming information, and so on. Records in the datastore may organize user profiles according to the International Mobile Subscriber Identifier (IMSI) or Mobile Station International Subscriber Directory Number (MSISDN) of the subscriber device. For a WPS subscriber (i.e., a user who is authorized for WPS service), the database may include two user profiles: a "home" profile for network services provided by the home network and visited or roaming networks which will recognize or honor WPS requests and a "roaming" profile for network services provided by visited or roaming networks which do not recognize WPS requests. Each profile may include a list of PLMNs to which the profile would apply. For example, the "home" profile of a WPS subscriber would indicate that the subscriber is entitled to WPS service in addition to IMS service, data service, and so on. The "roaming" profile for the same subscriber may be the same as or similar to the "home" profile but omitting WPS service. Additional user profiles may be stored for the subscriber device which include service parameters tailored to services supported by other visited networks or service level agreements with other visited networks. WPS service may include IMS services such as voice calls, short message service (SMS), and multimedia message service (MMS) as well as data transmission service (e.g., Internet access or access to Access Point Names (APNs), Domain Network Names (DNNs), or other data networks).

Because WPS status may be applicable to multiple types of services (e.g., IMS, data) supported by the wireless network, WPS service may be identified or configured according to the applicable network slice of the service. For example, dedicated network slices may be configured for WPS IMS service or for WPS data transmission which prioritize WPS traffic over non-WPS traffic. Thus, a user profile may be stored by the home network for the user device which indicates a higher QoS for WPS-authorized data traffic.

In some implementations, the multiple user-profile solution may be a part of a multi-tiered solution for enhancing the reliability of placing WPS calls. For example, a similar solution may be implemented at the IMS core and/or the policy charging function devices for redundancy, such that the IMS core and/or the policy charging function receives an indication that the call is a WPS call along with the PLMN and overrides the user profile received from the subscriber management function to omit a request to the session manager for a dedicated bearer.

Technical effects of the technology disclosed herein include enabling WPS calls to be placed on wireless communication networks that do not recognize the WPS status of the device. When a visited network receives a request for a QCI-uplifted default bearer with a dedicated bearer for a WPS call, absent an agreement to support higher-priority calls with the home network, the visited network will not recognize the request and the call will fail. Selectively omitting a request for a dedicated bearer along with an uplifted default bearer for the WPS call (in effect downgrading the priority or status of the WPS call) enables the call to be placed by the visited network as any other default or normal-priority call. Supporting multiple user profiles for a WPS device or subscriber at the subscriber management device of the wireless network is suited to the role of the subscriber management device of managing subscriber-related information and providing authentication and authorization services, thus reducing the complexity of implementing the solution across the network. Somewhat ironically, it is the very nature of WPS calls, which demand a higher QoS along with greater reliability, that thwarts the successful placement of a WPS call on a visited network. The technology disclosed herein improves the reliability which should be accorded to WPS calls along with mitigating the impact to network key performance indicators (KPIs).

Turning now to the Figures, FIG. 1 illustrates operational environment 100 for WPS call handling at a roaming or non-WPS supported location in an implementation. Operational environment 100 includes user equipment (UE) 110, home network 120, visited network 130, and user equipment (UE) 140. Visited network 130 includes RAN 131. Home network 120 is a wireless communication network to which UE 110 is subscribed with WPS service authorized. UE 110, a mobile originating (MO) device, sends WPS call request 151 to RAN 131 to place a call to UE 140, a mobile terminating (MT) device receiving the call.

UE 110 is representative of smartphones, computers, sensors, controllers, and/or some other user apparatus with processing circuitry for wireless communication. UE 110 exchanges wireless communication signals with RAN 131 over radio frequency bands. RAN 131 is representative of equipment using radio frequencies to provide wireless connectivity to devices, such as Fifth Generation (5G) RANs, long-term evolution (LTE) RANs, gNodeBs, eNodeBs, NB-IOT access nodes, LP-WAN base stations, wireless relays, Wifi access nodes, Wifi hotspots, ENET access nodes, Bluetooth access nodes, and/or other wireless or wireline network transceivers.

UE 110 and RAN 131 are representative of wireless communication devices or radios which wirelessly communicate using protocols such as Fifth Generation New Radio (5GNR), 5G Advanced, LTE, Institute of Electrical and Electronic Engineers (IEEE) 802.11 (Wifi), Low-Power Wide Area Network (LP-WAN), Near-Field Communications (NFC), Code Division Multiple Access (CDMA), Frequency Division Multiple Access (FDMA), and Time Division Multiple Access (TDMA). Although illustrated as a tower, RAN 131 may also include other types of access nodes, such as a WLAN access nodes, and communication with home network 120 or visited network 130 may be relayed through a Non-3GPP Inter-Working Function (N3IWF) network function (not shown) of the respective network. (3GPP stands for $3^{rd}$ Generation Partnership Project.)

Figure 7:
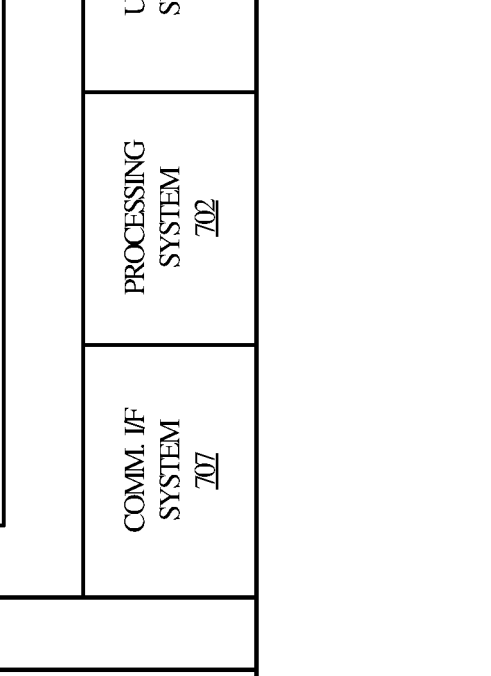
FIG. 7 illustrates a computing system suitable for implementing the various operational environments, architectures, processes, scenarios, and sequences discussed below with respect to the other Figures.
Figure 7:

Home network 120 is representative of a network capable of using a Fifth Generation New Radio (5GNR) or LTE protocol to communicate with UE 110 via a RAN, such as RAN 131. In an implementation, home network 120 is representative of a service-based architecture (SBA) which includes network functions which constitute the control plane and user plane of a wireless communication network core. The network functions are implemented on one or more suitable computing devices, of which computing device 701 of FIG. 7 is representative. Examples of suitable computing devices include server computers, blade servers, and the like. The network elements of home network 120 may be implemented in the context of one or more data centers, in a co-located or distributed manner, or in some other arrangement.

Network functions of home network 120 include session manager 121, policy charging function 122, IMS core 123, and subscriber management function 124. Home network 120 may also include other network functions or virtual network functions (not shown). Datastore 125 is representative of a datastore hosted by a network function of home network 120, such as a Unified Data Repository (UDR). In a 5G wireless network, the session manager may be a Session Management Function (SMF); the mobility management function may be an Access and Mobility Management Function (AMF); and the policy enforcement function may be a Policy Control Function (PCF). In an LTE network implementation of home network 120, the session manager function may be a Packet Data Network Gateway (PGW); the mobility management function may be a Mobility Management Entity (MME); and the policy enforcement function may be a Policy Charging and Rules Function (PCRF).

In operation, UE 110 sends registration request 151 to RAN 131 for the purpose of making a WPS voice call via visited network 130 to UE 140. RAN 131 sends SIP invite 152 to home network 120 which is received by IMS core 123 of home network 120. In an implementation, session manager 121 of home network 120 receives registration request 151 including parameters relating to the request for access from a mobility management function of visited network 130, which is then relayed to IMS core 123. The parameters relating to the registration request include a device identifier (e.g., SUCI, SUPI), Domain Network Name (DNN) or Access Point Name (APN), a device location, a Public Land Mobile Network (PLMN) for roaming RAN 131, radio access type (e.g., 5G, LTE, WLAN, etc.), device relationship with the wireless networks, etc.

In response to receiving SIP invite 152, IMS core 123 of home network 120 requests a user profile for UE 110 from subscriber management function 124 of home network 120. The request from IMS core 123 includes a device identifier for UE 110 and the PLMN of RAN 131. Subscriber management function 124 of home network 120 selects a user profile from among at least two user profiles for UE 110 from datastore 125. Datastore 125 stores user profiles for subscriber devices such as UE 110 according to the device identifier (as illustrated, IMSI "123") and the PLMN category applicable to RAN 131 of visited network 130 (as illustrated, PLMN category "Roaming"). Subscriber management function 124 returns the selected user profile ("normal") which includes a priority level indication that the call should be handled normally or at a normal or default priority level. Although the unselected user profile for UE 110 ("Home") indicates that UE 110 is authorized for WPS-priority IMS service, on the basis of the PLMN indicated in the SIP invite, subscriber management function 124 returns the user profile to IMS core 123 which does not include WPS authorization among the services to which UE 110 is authorized or entitled, thereby precluding a request to visited network 130 for a dedicated bearer and an uplifted default bearer for the call. IMS core 123 configures a request for policy charging function 122 to establish a PDU session in accordance with the user profile. Policy charging function 122 in turn requests session manager 121 of home network 120 establish a default bearer for the IMS call. Session manager 121 sends request 153 for a default bearer to RAN 131 of visited network 130 which establishes a normal priority call for UE 110 via visited network 130. Because request 153 is for a default bearer for normal-priority call, visited network 130 will honor the request by establishing default bearer 154 and the call will be placed. In contrast, had session manager 121 requested an uplifted default bearer for the WPS call, if visited network 130 does not recognize the WPS status, it will not honor the request, and the call would fail.

Figure 2:
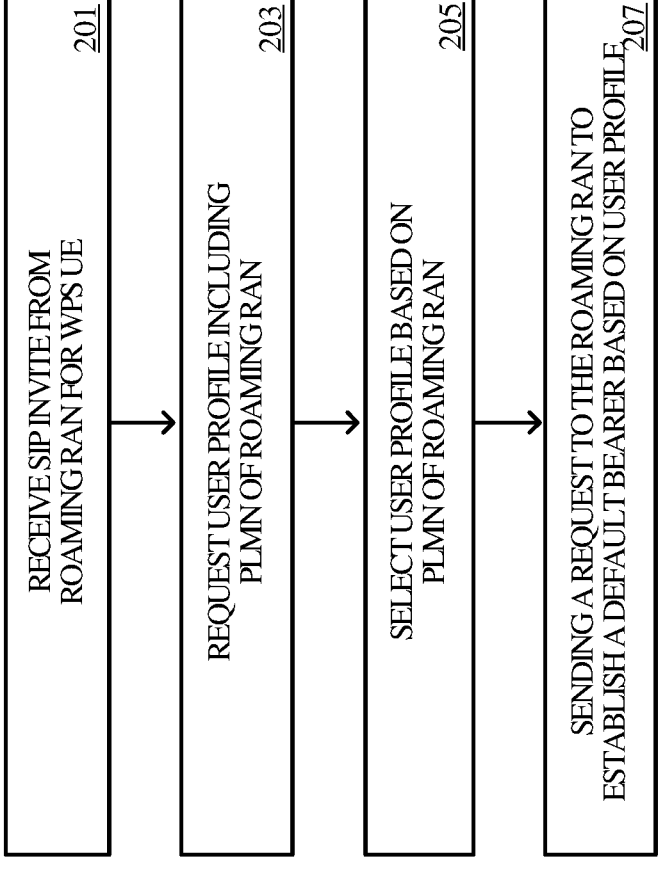
FIG. 2 illustrates a method for WPS call handling in an implementation.

FIG. 2 illustrates process 200 for WPS call handling at a roaming or non-WPS supported location in an implementation. Process 200 may be implemented on one or more computing devices, such as server computers or computers in the context of a network data center, according to program instructions which direct the computing devices to function as follows, referring parenthetically to the steps in FIG. 2 and in the singular for the sake of clarity.

In process 200, a user device, such as a mobile phone, is subscribed to a wireless communication network (i.e., the home network) and authorized to make WPS calls. The home network receives a SIP invite for the user device from the RAN of a network to which the user device is not subscribed (i.e., a roaming network) to establish a call (step 201). The SIP invite includes the PLMN of the RAN relaying the request. The user device, which is authorized for WPS calls, may initiate a WPS call automatically or when the user enters a prefix before the call which indicates that the call is a WPS call. In an implementation, a mobility management function of the roaming network sends the request to a session manager of the home network. The request may include a device identifier (e.g., IMSI), Domain Network Name (DNN) or Access Point Name (APN), a device location, a Public Land Mobile Network (PLMN), radio access type (e.g., 5G, LTE, WLAN, etc.), device relationship with the wireless networks, etc. The request may include an indication that the call is a WPS call.

Upon receiving the request, the IMS core of the home network requests a user profile for the user device from the subscriber management function (step 203). In an implementation, the request includes the PLMN of the RAN transmitting the SIP request along with a device identifier.

Based on the information in the request, the subscriber management function selects a user profile for the user device according to the PLMN (step 205). In an implementation, the subscriber management function consults a datastore of user profiles which includes at least two user profiles for the user according to the PLMN of the request. The subscriber management function selects the user profile associated with the PLMN. For example, the PLMN of the visited network may be included in a group or category of PLMNs identified as "roaming." The user profile for the roaming group includes information regarding the types of services to which the user device is entitled and that the call priority is a normal or standard priority level (i.e., a priority level for which a default bearer is to be established without a QCI uplift).

Having selected the user profile for the roaming RAN, the IMS core of the home network sends a request to the roaming RAN to establish a default bearer for the call (step 207). In an implementation, the IMS core sends a request for a PDU session to a policy charging function of the home network, which in turn sends a request to a session manager of the home network for a default bearer. The session manager sends the request for the default bearer to the roaming RAN via elements of the access network of the roaming RAN, such as through the AMF/MME of the visited network.

Referring again to FIG. 1, operational environment 100 illustrates a brief example of process 200 as employed by elements of operational environment 100. In operation, UE 110 requests to place a call to UE 140 via visited network 130. The request is received by RAN 131 of visited network 130 which sends SIP invite 152 to IMS core 123 of home network 120. Upon receiving the request, IMS core 123 requests a user profile for UE 110 from subscriber management function 124.

To retrieve a user profile for UE 110 in response to the request, subscriber management function 124 consults datastore 125 including user profiles for subscriber devices. User profiles in datastore 125 include at least two profiles for WPS-authorized subscriber devices: a user profile for establishing WPS service and a user profile for normal or non-WPS service. The user profiles are categorized by PLMN such that for a PLMN of the home network, subscriber management function 124 retrieves and sends the WPS profile to IMS core 123. On the other hand, for a PLMN of a roaming network, such as the network of a different service provider different from the subscriber service provider, subscriber management function 124 retrieves and sends the non-WPS profile to IMS core 123.

When IMS core 123 receives the non-WPS profile from subscriber management function 124, IMS core 123 requests the establishment of a PDU session from policy charging function 122. Policy charging function 122 in turn sends a request to session manager 121 to create default bearer for the call. Session manager 121 sends the request for the default bearer to a mobility management function (not shown) of visited network 130, causing visited network 130 to establish the call as a normal, non-priority call.

Figure 3:
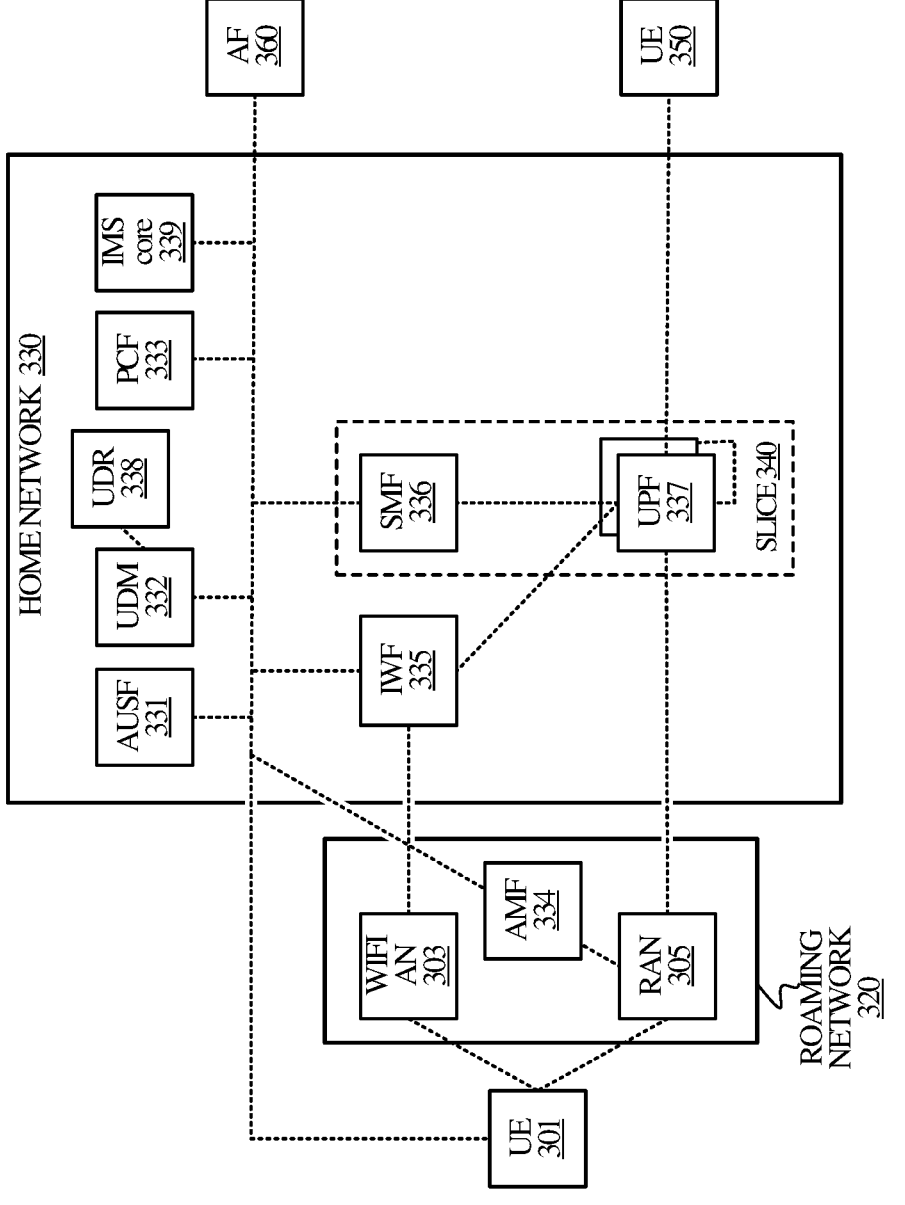
FIG. 3 illustrates an operational architecture for a network data center of a wireless communication network in an implementation.
Figure 3:

FIG. 3 illustrates exemplary wireless communication system 300 that serves wireless User Equipment (UE) 301. Wireless communication system 300 comprises UE 301, home network 330, roaming network 320, UE 350, and application function (AF) 360. Home network 330 includes Authentication Server Function (AUSF) 331, Unified Data Management (UDM) 332, Unified Data Repository (UDR) 338, Policy Control Function (PCF) 333, IMS core 339, Interworking Function (IWF) 335, Session Management Function (SMF) 336, and User Plane Function (UPF) 337. IMS core 339 includes network functions such as a CSCF (not shown) and an SBC (not shown). IWF 335 includes non-3GPP IWFs (N3IWFs) for providing untrusted non-3GPP access to network data center 330, such as access via a non-cellular access network. Wireless network slice 340 of network data center 330 includes UPF 337 and SMF 336. Roaming network 320 includes Wifi Access Node (AN) 303, 5GNR RAN 305, Interworking Function (IWF) 335, and Access and Mobility Management Function (AMF) 334. UE 350 is representative of a mobile terminating user device for the end-to-end communication path from mobile originating UE 301. AF 360 may provide policies applicable to control plane functions, that is, to the application, presentation, and/or session layers of the OSI protocol stack.

In a brief exemplary operation, UE 301 is a 5G-enabled mobile device subscribed to the network data center of home network 330 authorized for WPS service. UE 301 communicates with home network 330 via 5GNR access node 305 or Wifi access node 303 of roaming network 320. UE 301 sends a registration request to place a WPS call via the communication network of home network 330. SMF 336 of home network 330 receives the registration request from AMF 334 of roaming network 320.

Figure 4:
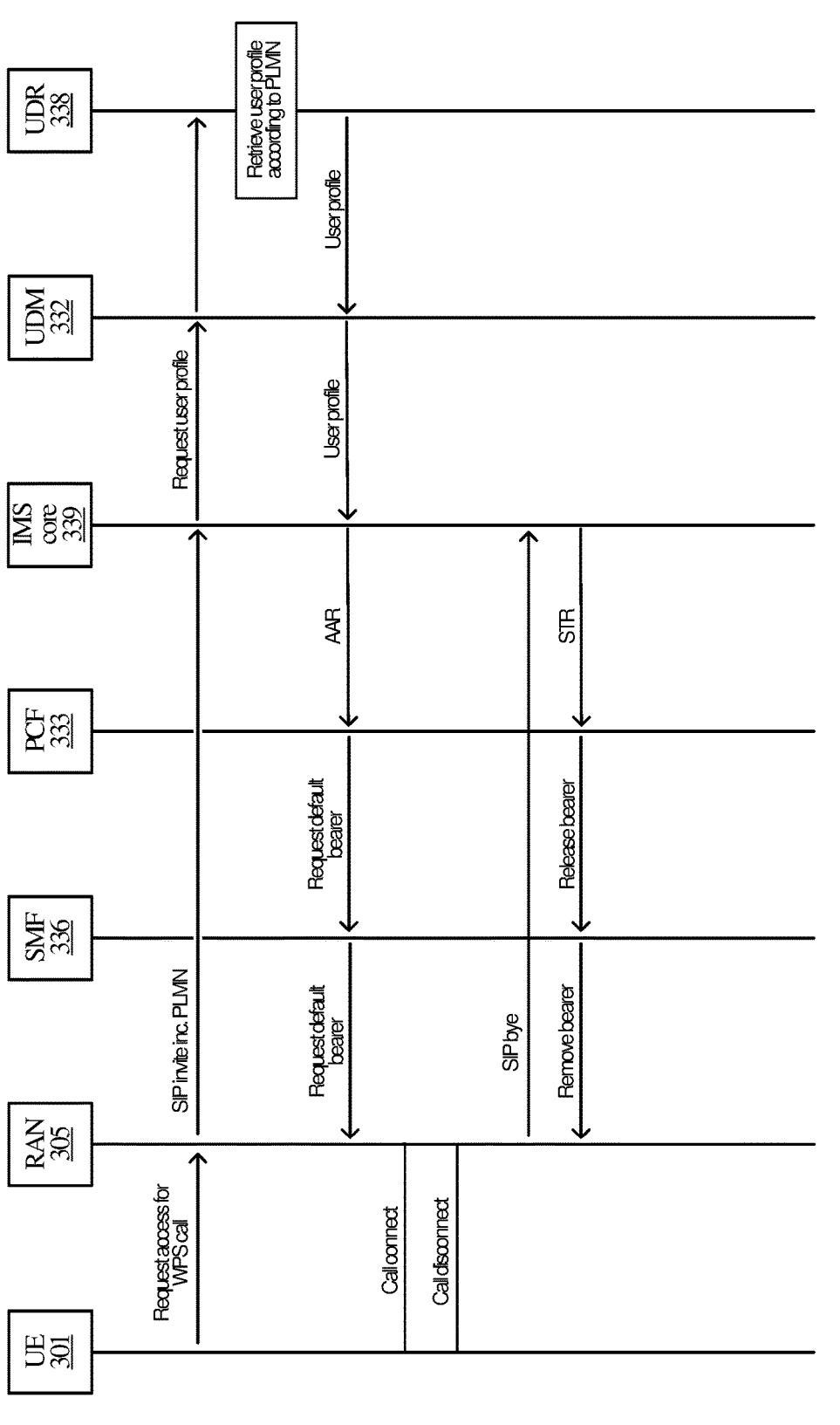
FIG. 4 illustrates a workflow for WPS call handling in an implementation.

FIG. 4 illustrates workflow 400 for WPS call handling at a roaming or non-WPS supported location in an implementation referring to elements of FIG. 3. FIG. 4 illustrates workflow 400 for registering a user device according to a standard or default workflow, such as a workflow prescribed by 3GPP standards, in an implementation. Note that acknowledgement messages are omitted from workflow 400 for clarity.

In workflow 400 of FIG. 4, UE 301 sends a request to RAN 305 of roaming network 320 to place a WPS call to UE 350. RAN 305 relays a SIP invite to IMS core 339 of home network 330. The SIP invite includes a device identifier for UE 301, such as an IMSI, and the PLMN of RAN 305 which indicates that RAN 305 is a roaming RAN with respect to UE 301. IMS core 339, in response to the SIP invite, requests from UDM 332 a user profile for UE 301. The request to UDM 332 indicates the PLMN of RAN 305 and the device identifier for UE 301.

UDM 332 retrieves a user profile from UDR 338 in response to the request. UDR 338 includes at least two profiles for UE 301. User profiles provided by UDR 338 to UDM 332 include information such as an IMSI, MSISDN, or subscriber identity module (SIM) card details; authentication and security information, such as authentication keys to validate the subscriber's identity; subscription data such as subscribed services (e.g., IMS, data, WPS), service options, tariff plans, billing preferences, APN types (e.g., Internet, MMS, IMS), and other service related parameters; access and connectivity information such as supported radio access technologies (RATs) (e.g., 3g, 4g, 5g, Wifi), supported frequency bands, and mobility-related information; QoS levels for different types of applications, services, or APNs; subscriber location information; service data, such as specific services to which the device or user is subscribed; and roaming data, including roaming-related information such as preferred roaming partners, allowed roaming zones, and service restrictions while roaming.

In an implementation, each user profile is identified by a user device identifier such as an IMSI or MSISDN. Each user profile includes a group or category of PLMNs for which the user profile is to be applied, such as a "home" group and a "roaming" group. The roaming group includes PLMNs which will not recognize or honor a request for a dedicated bearer with an uplifted default bearer for a WPS call from home network 330. UDM 332 returns a roaming profile to IMS core 339 which indicates that a normal-priority default bearer should be established for the call.

IMS core 339 sends an access and authorization request (AAR) to PCF 333 which sends a request for default bearer to SMF 336 based on the information in the user profile supplied by UDM 332. SMF 336 requests a default bearer from RAN 305. Roaming network 320 establishes a default bearer for the call and the call commences as a normal, non-WPS call to UE 350. Upon completion of the call, RAN 305 sends a SIP bye message to IMS core 339. IMS core 339 sends a service termination (STR) message to PCF 333 which causes SMF 336 and RAN 305 to terminate the default bearer.

Figure 5:
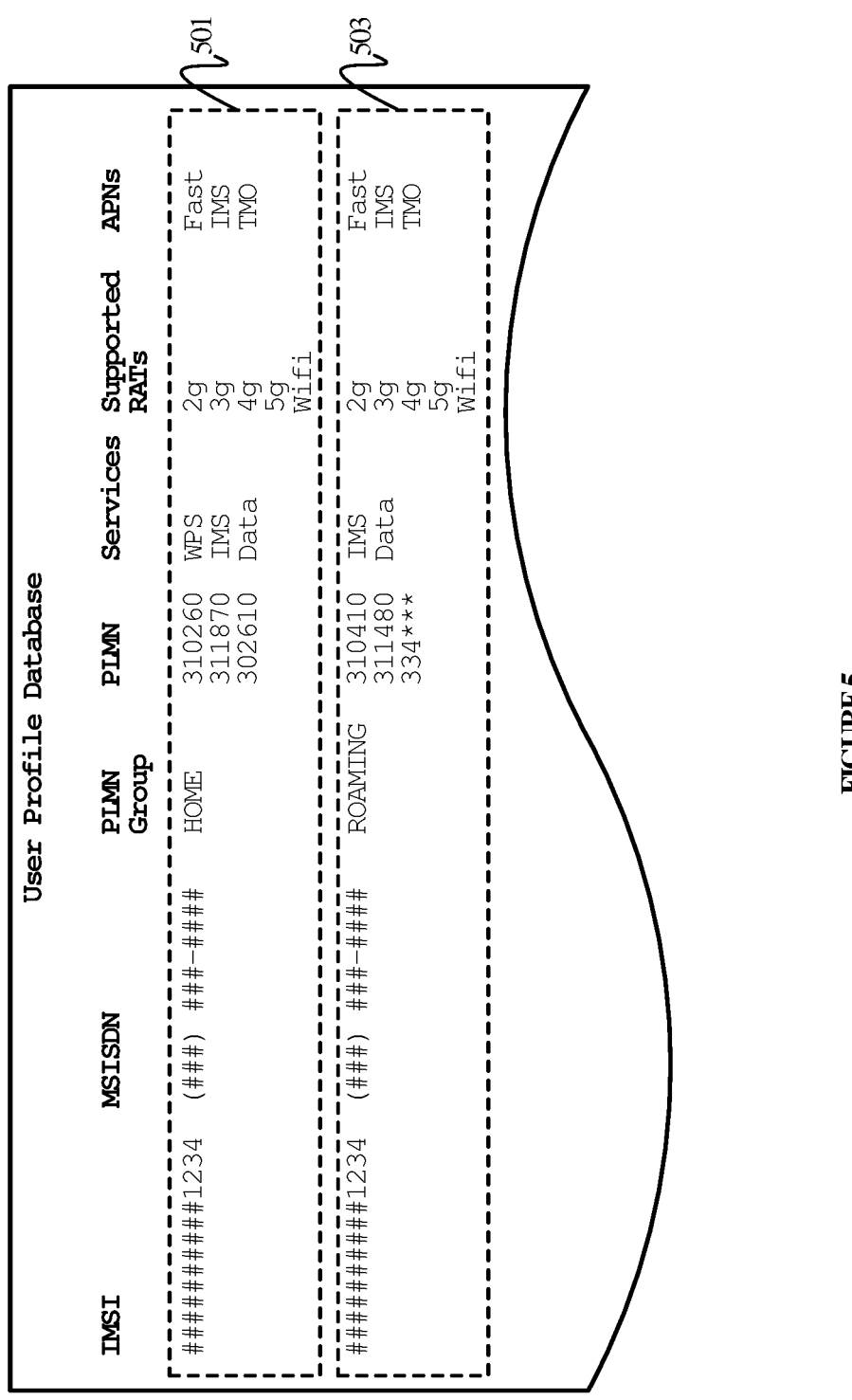
FIG. 5 illustrates a user profile datastore for WPS call handling in an implementation.

FIG. 5 illustrates user profile datastore 500 for WPS call handling at a roaming or non-WPS supported location in an implementation. User profile datastore 500 is representative of a datastore of a wireless network to which a user device is subscribed and for which WPS service is authorized. User profile datastore 500 may be implemented in a UDR of the wireless network and accessed by a UDM or HSS of the network when the wireless network receives a registration request with respect to the user device. For example, when an IMS core of the wireless network receives a SIP invite for a subscribed user device from a roaming RAN, IMS core will request from a network UDM a user profile for establishing the call. The request will include a device identifier (e.g., the device IMSI or MSISDN) and a PLMN of the roaming RAN.

In an exemplary implementation, upon receiving the request for a user profile from the IMS core, the UDM will access the datastore hosted by the UDR to obtain a user profile associated with the device IMSI (ending in "1234") and the PLMN. As illustrated in FIG. 5, user profiles 501 and 503 in user profile datastore 500 are organized according to IMSI and/or MSISDN, then according to PLMN category. The PLMN categories for the displayed device include a HOME category and a ROAMING category. Each PLMN category includes one or more PLMNs, each associated with a wireless carrier or service provider. The UDM selects a user profile of user profiles 501 and 503 based on the PLMN category corresponding to the PLMN of the roaming RAN. For example, if the PLMN of the roaming RAN is 310260, the UDM will select user profile 501 provided for the HOME category.

As further illustrated in user profile datastore 500, user profile 501 for the HOME category includes WPS service, indicating the user or user device is authorized for WPS service, while the ROAMING category omits WPS service. When a registration request is received from a roaming RAN of a network associated with the ROAMING category, the UDM supplies user profile 503 to the IMS core which results in a request to the roaming RAN for a normal default bearer for a normal priority call. Alternatively, when a registration request is received from a roaming RAN associated with the HOME category, the UDM supplies user profile 501 to the IMS core which results in a request to the roaming RAN for a dedicated bearer with a QCI uplift for the default bearer. Thus, (the PLMNs of) wireless service providers which recognize or support WPS priority service, such as WPS calls, may be assigned to the HOME category, while (the PLMNs of) wireless carriers which do not recognize or support WPS priority service may be assigned to the ROAMING category.

Figure 6:
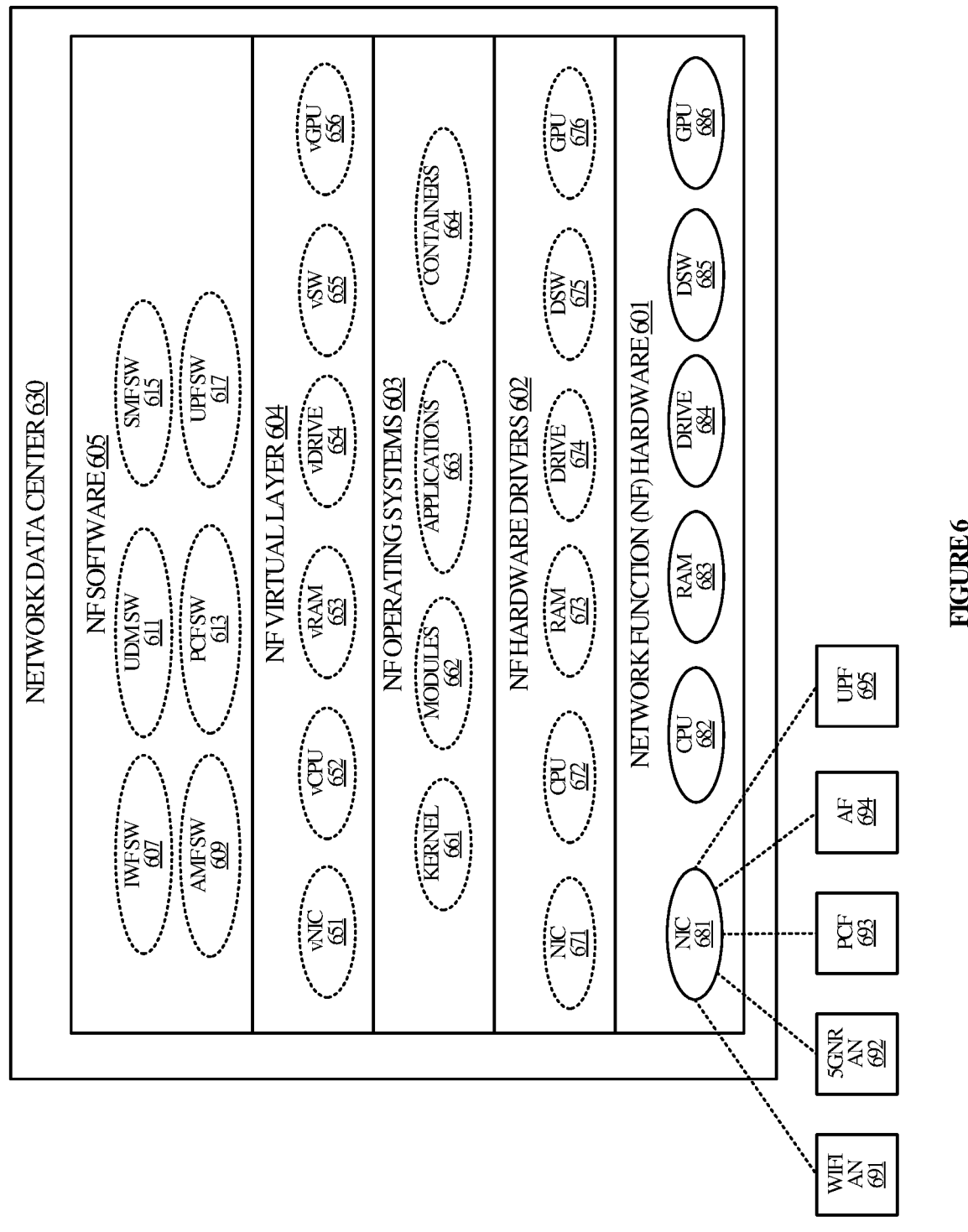
FIG. 6 illustrates a systems architecture for a network data center of a wireless communication network in an implementation.

FIG. 6 illustrates exemplary network data center 630, a network core of a wireless communication system, of which home network 120 of FIG. 1 is representative. Network data center 630 includes network function (NF) software 605, network function virtual layer 604, network function operating systems 603, network function hardware drivers 602, and network function hardware 601.

Network function software 605 of network data center 630 includes software for executing various network functions: IWF software 607, AMF software 609, UDM software 611, PCF software 613, SMF software 615, and UPF software 617. Other network function software, such as network repository function (NRF) software, are typically present but are omitted for clarity.

Network function virtual layer 604 includes virtualized components of network data center 630, such as virtual NIC 651, virtual CPU 652, virtual RAM 653, virtual drive 654, virtual software 655, and virtual GPU 656. Network operating systems 603 includes components for operating network data center 630 including kernels 661, modules 662, applications 663, and containers 664 for network function software execution. Network function hardware drivers 602 include software for operating network function hardware 601 of network data center 630, including network interface card (NIC) drivers 671 for network interface cards (NICs) 681, CPU drivers 672 for CPUs 682, RAM drivers 673 for RAM 683, flash/disk drive drivers 674 for flash/disk drives 684, data switch (DSW) drivers 675 for data switches 685, and drivers 676 for GPUs 686. Network interface cards 681 of network function hardware 601 include hardware components for communicating with Wifi access node 691, 5GNR access node 692, PCF 693, application server 694, and UPF 695.

Turning now to FIG. 7, architecture 700 illustrates computing device 701 that is representative of any system or collection of systems in which the various processes, programs, services, and scenarios disclosed herein may be implemented. Examples of computing device 701 include, but are not limited to, server computers, web servers, cloud computing platforms, and data center equipment, as well as any other type of physical or virtual server machine, container, and any variation or combination thereof. Examples also include desktop and laptop computers, tablet computers, mobile computers, and wearable devices.

Computing device 701 may be implemented as a single apparatus, system, or device or may be implemented in a distributed manner as multiple apparatuses, systems, or devices. Computing device 701 includes, but is not limited to, processing system 702, storage system 703, software 705, communication interface system 707, and user interface system 709 (optional). Processing system 702 is operatively coupled with storage system 703, communication interface system 707, and user interface system 709.

Processing system 702 loads and executes software 705 from storage system 703. Software 705 includes and implements WPS call handling process 706, which is representative of the WPS call handling processes discussed with respect to the preceding Figures, such as process 200. When executed by processing system 702, software 705 directs processing system 702 to operate as described herein for at least the various processes, operational scenarios, and sequences discussed in the foregoing implementations. Computing device 701 may optionally include additional devices, features, or functions not discussed for purposes of brevity.

Referring still to FIG. 7, processing system 702 may comprise a micro-processor and other circuitry that retrieves and executes software 705 from storage system 703. Processing system 702 may be implemented within a single processing device but may also be distributed across multiple processing devices or sub-systems that cooperate in executing program instructions. Examples of processing system 702 include general purpose central processing units, graphical processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device but may also be implemented across multiple storage devices or sub-systems co-located or distributed relative to each other. Storage system 703 may comprise additional elements, such as a controller, capable of communicating with processing system 702 or possibly other systems.

Software 705 (including WPS call handling process 706) may be implemented in program instructions and among other functions may, when executed by processing system 702, direct processing system 702 to operate as described with respect to the various operational scenarios, sequences, and processes illustrated herein. For example, software 705 may include program instructions for implementing the WPS call handling processes as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtualization software, or other application software. Software 705 may also comprise firmware or some other form of machine-readable processing instructions executable by processing system 702.

In general, software 705 may, when loaded into processing system 702 and executed, transform a suitable apparatus, system, or device (of which computing device 701 is representative) overall from a general-purpose computing system into a special-purpose computing system customized to WPS call handling. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary, etc.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware implementation, an entirely software implementation (including firmware, resident software, micro-code, etc.) or an implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the disclosure. Those skilled in the art will also appreciate that the features described above may be combined in various ways to form multiple implementations. As a result, the invention is not limited to the specific implementations described above, but only by the claims and their equivalents.

The wireless data network circuitry described above comprises computer hardware and software that form special-purpose wireless system circuitry to serve wireless user devices based on policies. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless system circuitry to serve wireless user devices based on policies.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless network, the wireless network comprising a subscriber management function, an Internet protocol multimedia service (IMS) core, and a session manager, the method comprising:

receiving, from a roaming radio access network (RAN) by the IMS core, a session initiation protocol (SIP) invite for a call from a user device, wherein the SIP invite includes a public land mobile network identifier of the roaming RAN and wherein the user device is a wireless priority service (WPS) subscriber of the wireless network;

sending, to the subscriber management function by the IMS core, a request for a user profile for the user device, wherein request includes the public land mobile network identifier of the roaming RAN;

identifying, by the subscriber management function, the user profile for the user device from among multiple user profiles for the user device based on the public land mobile network identifier of the roaming RAN, wherein each of the multiple user profiles corresponds to a public land mobile network category of multiple public land mobile network categories; and sending, to the roaming RAN by the session manager, a request to establish a default bearer for the call based on the user profile.

2. The method of claim 1, wherein if the roaming RAN recognizes a WPS status for the call, the wireless network requests from the roaming RAN a dedicated bearer and a Quality-of-Service Class Indicator uplift for the default bearer for the call, and wherein if the roaming RAN does not recognize the WPS status for the call, the wireless network requests from the roaming RAN a standard default bearer for the call.

3. The method of claim 1, wherein the multiple public land mobile network categories include a home category and a roaming category.

4. The method of claim 3, wherein the user profile corresponding to the home category includes WPS service and wherein the user profile corresponding to the roaming category does not include WPS service.

5. The method of claim 4, wherein WPS service includes a dedicated bearer with a Quality-of-Service Class Indicator uplift for the default bearer.

6. The method of claim 1, wherein the wireless network further comprises a policy enforcement function and wherein sending, to the roaming RAN by the session manager, the request to establish a default bearer based on the user profile comprises:

receiving, by the policy enforcement function from the IMS core, an authentication request for the user device;

sending, to the session manager by the policy enforcement function, a request to set up a default bearer for the call; and sending, to the roaming RAN by the session manager, the request for the default bearer to establish the call.

7. The method of claim 6, wherein the subscriber management function comprises a Unified Data Management function, the policy enforcement function comprises a Policy Charging Function, and the session manager comprises a Session Management Function.

8. The method of claim 7, wherein the multiple user profiles for the user device are stored by a Unified Data Repository operatively coupled to the Unified Data Management function of the wireless network.

9. The method of claim 1, wherein the call is a WPS call.

10. A method of operating a wireless network, comprising:

receiving, from a roaming radio access network (RAN) of a visited wireless network, a session initiation protocol (SIP) invite for a call from a user device, wherein the user device is subscribed to the wireless network and is authorized for wireless priority service (WPS) from the wireless network, wherein the wireless network is different from the visited wireless network, and wherein the SIP invite includes a public land mobile network identifier of the roaming RAN;

identifying a user profile for the user device from among multiple user profiles for the user device based on the public land mobile network identifier of the roaming RAN, wherein each of the multiple user profiles corresponds to a public land mobile network category of multiple public land mobile network categories; and sending, to the roaming RAN, a request to establish a default bearer for the call based on the user profile.

11. The method of claim 10, wherein the multiple public land mobile network categories include a home category and a roaming category.

12. The method of claim 11, wherein the user profile corresponding to the home category includes WPS service and wherein the user profile corresponding to the roaming category does not include WPS service.

13. The method of claim 12, wherein WPS service includes a dedicated bearer with a Quality-of-Service Class Indicator uplift for the default bearer.

14. The method of claim 10, wherein the multiple user profiles for the user device are stored by a Unified Data Repository operatively coupled to a Unified Data Management function of the wireless network.

15. A computing apparatus comprising:

one or more computer-readable storage media;

one or more processors operatively coupled with the one or more computer-readable storage media; and program instructions stored on the one or more computer-readable storage media that, when executed by the one or more processors, direct the computing apparatus to:

receive, from a roaming radio access network (RAN) of a visited wireless network, a session initiation protocol (SIP) invite for a call from a user device, wherein the user device is subscribed to a wireless network and is authorized for wireless priority service (WPS) from the wireless network, wherein the wireless network is different from the visited wireless network, and wherein the SIP invite includes a public land mobile network identifier of the roaming RAN;

identify a user profile for the user device from among multiple user profiles for the user device based on the public land mobile network identifier of the roaming RAN, wherein each of the multiple user profiles corresponds to a public land mobile network category; and send, to the roaming RAN, a request to establish a default bearer for the call based on the user profile.

16. The computing apparatus of claim 15, wherein the public land mobile network categories include a home category and a roaming category.

17. The computing apparatus of claim 16, wherein the user profile corresponding to the home category includes WPS service and wherein the user profile corresponding to the roaming category does not include WPS service.

18. The computing apparatus of claim 17, wherein WPS service includes a dedicated bearer with a Quality-of-Service Class Indicator uplift for the default bearer.

19. The computing apparatus of claim 15, wherein the multiple user profiles for the user device are stored by a Unified Data Repository operatively coupled to a Unified Data Management function of the wireless network.

20. The computing apparatus of claim 15, wherein the call is a WPS call.

* * * * *